(12) United States Patent
Kraus et al.

(10) Patent No.: US 6,453,654 B1
(45) Date of Patent: Sep. 24, 2002

(54) APPARATUS FOR CONDITIONING CROP MATERIALS

(75) Inventors: Timothy J. Kraus, Honey Brook, PA (US); Imants Ekis, Leola, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/873,804

(22) Filed: Jun. 4, 2001

(51) Int. Cl.[7] .............................................. A01D 61/00
(52) U.S. Cl. .................................. 56/16.4 R; 56/16.4 C
(58) Field of Search ........................... 56/16.4 B, 14.5, 56/16.4 A, 16.4 C, 14.6, 16.4 R, DIG. 1, DIG. 2, 504, 505; 100/88; 460/114

(56) References Cited

U.S. PATENT DOCUMENTS

| | | | | |
|---|---|---|---|---|
| 3,722,191 A | * | 3/1973 | Braunberger | 56/189 |
| 3,835,629 A | * | 9/1974 | Rosendahl et al. | 56/14.4 |
| 4,182,099 A | * | 1/1980 | Davis et al. | 56/16.4 R |
| 4,270,338 A | * | 6/1981 | Halls | 56/14.4 |
| 4,637,201 A | * | 1/1987 | Pruitt et al. | 56/16.4 B |
| 5,894,716 A | * | 4/1999 | Haldeman et al. | 56/14.5 |
| 5,950,406 A | | 9/1999 | Koegel et al. | 56/14.5 |
| 6,029,432 A | * | 2/2000 | Kraus et al. | 56/16.4 B |
| 6,101,797 A | | 8/2000 | Koegel et al. | 56/14.5 |

OTHER PUBLICATIONS

Advertising brochure from Kuhn on the "ALTERNA 500". 7 Pages ( 4 Sheets of Paper ) Date 1999 Month is not known.

* cited by examiner

*Primary Examiner*—Robert E. Pezzuto
*Assistant Examiner*—Árpád Fábián Kovács
(74) *Attorney, Agent, or Firm*—Larry W. Miller; John William Stader

(57) ABSTRACT

A reimpactor for an agricultural flail-conditioner is described to redirect conditioned crop to the rotating flail-conditioner for additional treatment prior to depositing it on the ground for drying. The reimpactor is constructed partially of a shock-absorbent material, such as urethane, so that it may retain its shape even upon impact with foreign objects such as stones or misshapen flails, thus displaying significant longevity and durability characteristics.

20 Claims, 7 Drawing Sheets

APPARATUS FOR CONDITIONING CROP MATERIALS

FIELD OF THE INVENTION

The present invention relates generally to flail-type crop conditioners for pull-type crop-treating equipment in the agricultural industry, and particularly to a flail-type conditioner that employs an improved reimpactor for redirecting treated crop material to the conditioning unit for additional treatment.

BACKGROUND OF THE INVENTION

During the process of producing and harvesting hay it is common to condition stalky plant material such as alfalfa, clover, or the like, by directing the crop material through a pair of conditioning rolls, thereby crimping the stems. This cracks the stems and thereby reduces the time cut plant material must remain in the field drying by increasing the rate at which moisture escapes.

In addition to crushing or crimping, it is also well known that plant drying can be further enhanced by subjecting the plants to the more severe conditioning provided by flails. Flail conditioning causes the plant stems to be even more severely crushed, with more of the waxy covering removed. The various levels of conditioning to which plant materials are subjected have a direct affect on the drying rate.

The instant invention relates to an improved reimpactor—a mechanism in a crop conditioning apparatus for redirecting materials already subjected to conditioning back to the conditioning unit for additional treatment. An example of a type of reimpactor is shown in U.S. Pat. No. 6,101,797, issued to Richard Koegel et al. on Aug. 15, 2000. Note, for example, in FIG. 3 thereof that guide elements 51 and 52 redirect the flow of crop materials in this maceration apparatus into the rotating impact rotor 23. A macerator is somewhat different from a conditioner in that it is intended to even more severely crush the crop materials.

Another example of a reimpactor is used in a commercial flail conditioner sold by Kuhn and identified as the "ALTERNA 500". An adjustable bar with protruding fixed finger elements, all extending in the same direction, is affixed above the flail. The bar may be rotated to move the finger elements into and out of the flow path of the crop material, thus adjusting the amount of crop material that is redirected into the flail for additional treatment.

Both the Koegel and Kuhn devices are rigid and thus in actual use become bent, deformed and broken when stones and other solid objects are passed through the apparatus. If, for example, a stone is fed into the conditioner and bends one of the fingers into the path of a flail element, either the finger or the flail element, or both, will likely be broken, and possibly even additional damage will result.

It would be desirable and beneficial to provide a reimpactor that would overcome the above-noted disadvantages of known reimpactors.

SUMMARY OF THE INVENTION

It is an object of the present invention to provide an improved reimpactor for use in a flail-type crop conditioner.

It is another object of the present invention to provide a slotted reimpactor that is solid and rigid enough to withstand the severe operating conditions of a flail-type crop conditioner, i.e., able to absorb and withstand impacts from stones and other solid objects.

It is a further object of the instant invention to provide a flail-type crop conditioner that is quieter in operation, requires less power, is more durable, reliable, and long-lasting than those known in the prior art.

It is a still further object of the instant invention to provide a reimpactor for an agricultural flail-conditioner to redirect conditioned crop material to the rotating flail-conditioner for additional treatment prior to depositing it on the ground for drying. The reimpactor is constructed partially of a shock-absorbent material, such as urethane, so that it may retain its shape even upon impact with foreign objects such as stones or misshapen flails, thus displaying significant longevity and durability characteristics.

The foregoing and other objects, features and advantages of the invention will appear more fully hereinafter from a consideration of the detailed description which follows, in conjunction with the accompanying drawings wherein one primary embodiment of the invention is illustrated by way of example. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed description of the invention, especially when taken in conjunction with the accompanying drawings wherein.

DETAILED DESCRIPTION OF THE INVENTION

Figure 1:
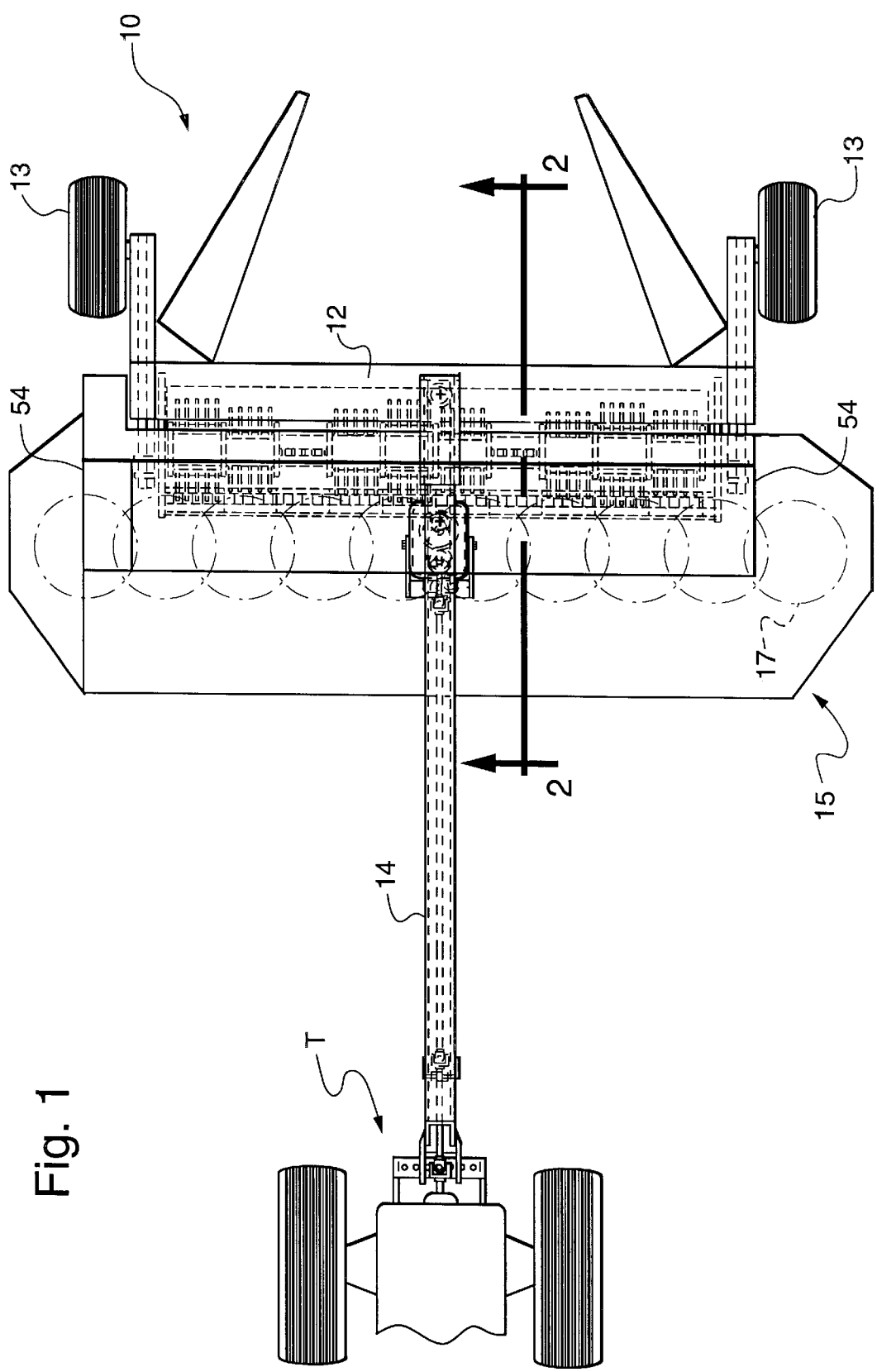
FIG. 1 is a top plan view of a disc mower flail-conditioner to which the instant invention has been applied.
Figure 2:
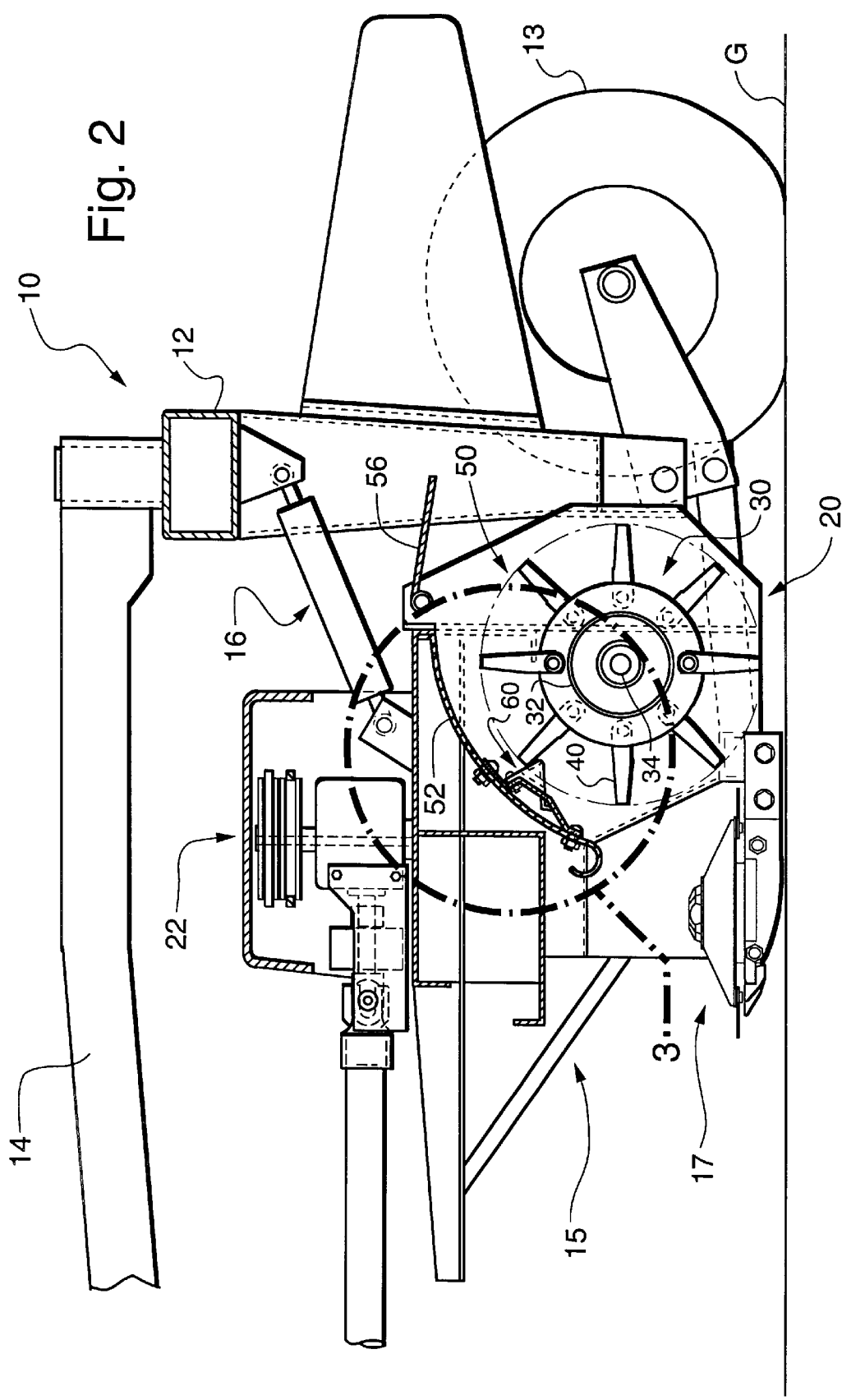
FIG. 2 is a vertical section taken along line 2—2 of FIG. 1 with the area of the invention marked by circle area 3.
Figure 3:
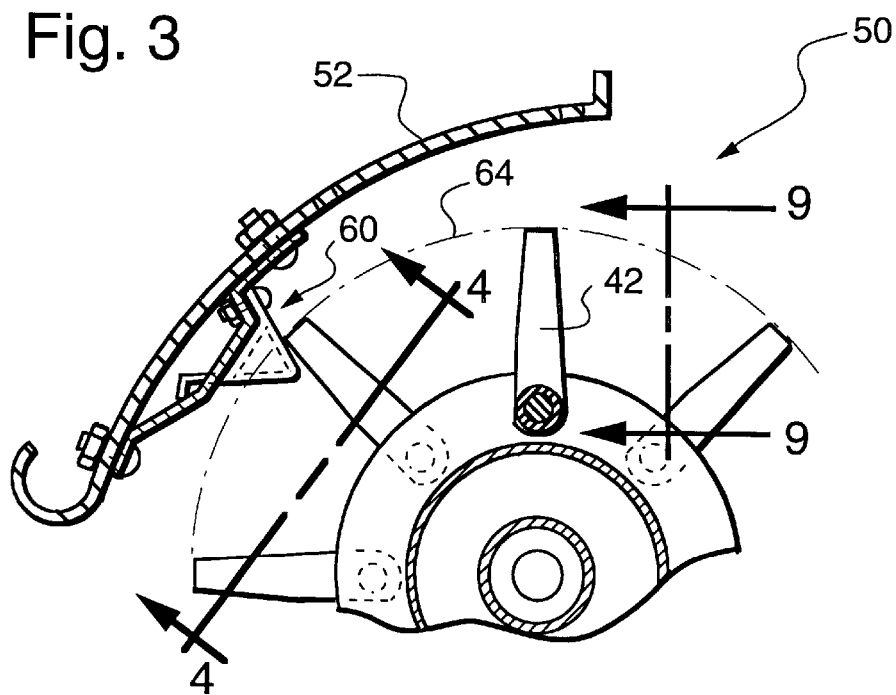
FIG. 3 is circle area 3 of FIG. 2 enlarged.

Referring now to the drawings and, particularly to FIGS. 1 and 2, a hay-harvesting machine, commonly referred to as the pull-type flail-conditioner, incorporating the principles of the instant invention can best be seen. Any "left" and "right" references are used as a matter of convenience and are determined by standing at the rear of the machine, facing the forward end, in the direction of travel.

Flail-conditioner 10 is provided with a frame 12 adapted for mobile movement over the ground G by wheels 13 rotatably mounted thereon. The frame 12 is provided with a pivotal drawbar 14 that extends forwardly therefrom for connection to a prime mover, such as a tractor T, in a conventional manner. The frame 12 supports a header 15 by flotation linkage 16 for a generally vertical movement relative to the ground G as is conventionally known. The header 15 includes a conventional disc cutterbar 17 operable to sever standing crop material from the ground G and convey it rearwardly to the conditioning mechanism 20. The drive mechanism 22 is supported from the drawbar 14 and the frame 12 to transfer rotational power from the prime mover in conventional manner to the operable elements of conditioner 10.

Figure 9:
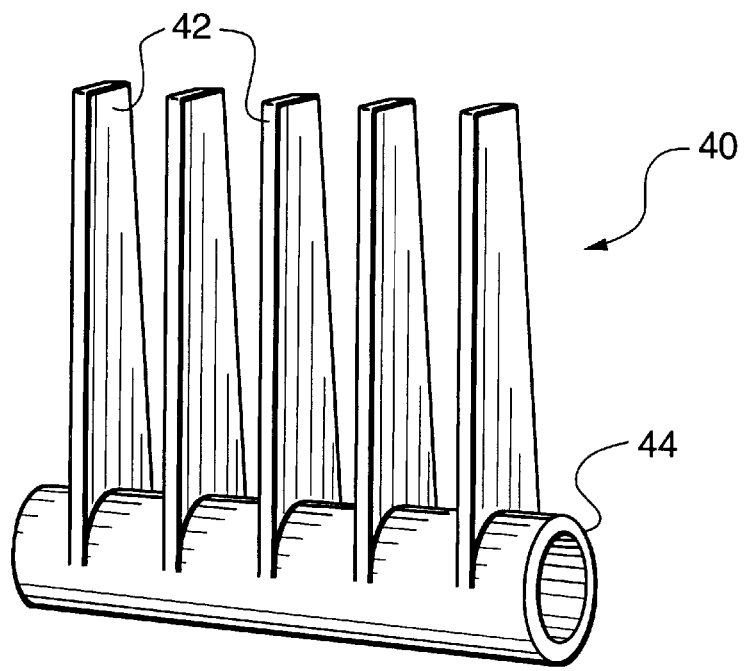
FIG. 9 is a perspective view of the one piece multiple tine casting.
Figure 10:
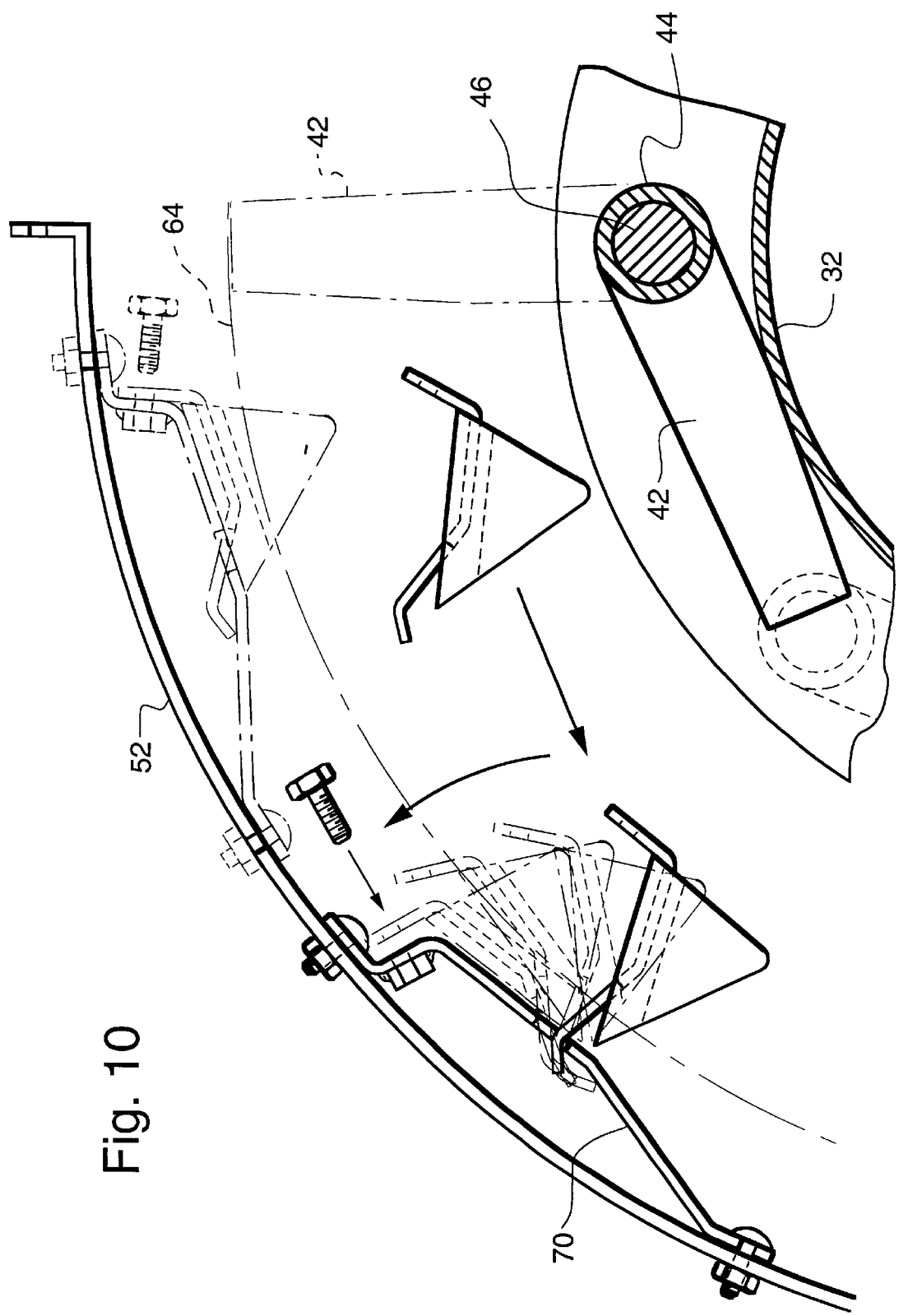
FIG. 10 is an enlarged schematic view similar to FIG. 3 showing a second reimpactor in position.

Referring more particularly now to FIG. 2, the general conditioning mechanism 20 will be described in further detail. The conditioning unit 30 is comprised of an elongated drum 32 rotatable about shaft 34 that is generally transverse to the direction of travel of conditioner 10. The flail segments 40, as seen in FIG. 9 in detail, are comprised of a plurality of flail elements 42 which are rigidly affixed to member 44. By mounting flail segments 40 on a shaft 46, extending through tube 44, the flail segments are pivotable about shaft 46 to the extent that they come into contact with drum 32 (see FIG. 10). The flail segments may be mounted on drum 32 in various configurations; however, the best arrangement seems to be staggered around the circumference of drum 32 such that they extend from one end of the drum to the other in a spiral fashion.

The conditioning unit 30 sits within a flail-conditioning chamber 50 formed by curved sheet 52, end sheets 54 (FIG. 1), and the ground G. There is a forward entrance into the flail-conditioning chamber above and to the rear of disc cutterbar 17, an exit below and to the rear of baffle 56. Curved sheet 52 and baffle 56 are generally the same length as conditioning unit 30 and extend between end sheets 54. The baffle 56 is adjustably mounted to move into and out of the flow of condition crop material to control, among other things, the thickness of the windrow.

Reimpactor 60, as will be further described below, is affixed to the inside of curved sheet 52. As the conditioner 10 moves through the field, crop is engaged to by disc cutterbar 17 and severed from the ground. It then flows rearwardly into the conditioning unit 30 where it is broken and crushed in a normal manner. As the crop material is treated it is thrown upwardly into and along curved sheet 52 where it engages reimpactor 60. The reimpactor redirects the crop material to the conditioning unit for additional treatment, and then returned to curved sheet 52, finally exiting onto the ground for drying.

Figure 6:
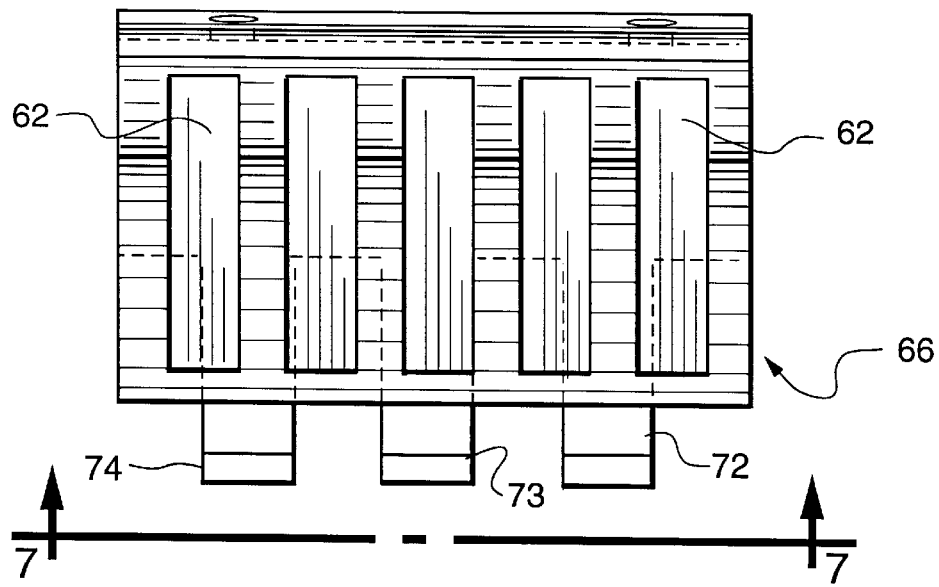
FIG. 6 is a plan view of a reimpactor module.
Figure 7:
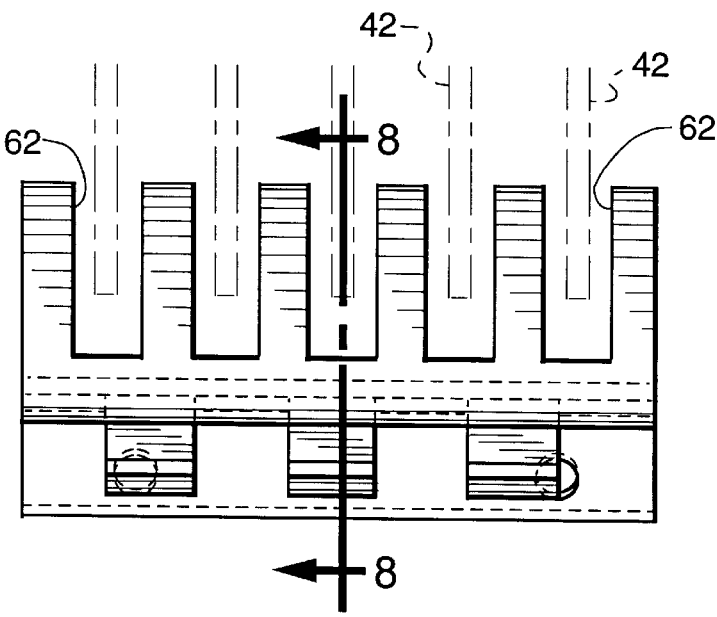
FIG. 7 is an elevation view of FIG. 6, from the side 7—7 thereof.
Figure 8:
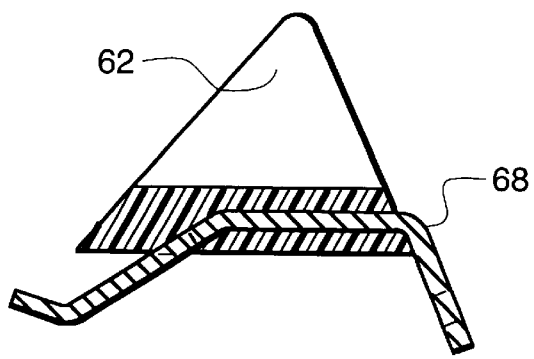
FIG. 8 is a sectional view of the module taken along line 8—8 of FIG. 7.

The reimpactor 60 may vary in construction and methods of incorporation into the flail-conditioner. The best mode is what is shown herein specifically; however, one of skill in the art will readily see alternatives and modifications. Attention is directed generally to FIGS. 3–8 and 10, but initially to FIG. 5 which shows that reimpactor 60 has a general triangular cross-section. FIGS. 6 and 7 show that reimpactor 60 has slots 62 therein which accommodate flail elements 42. Thus, referring briefly to FIG. 3, it can be seen that reimpactor 60 extends into and through the circular path 62 created by the tips of flail elements 42, while the flail elements 42 pass through slots 62. This arrangement assures that the crop material does not build up in front of, or merely bypass, the reimpactor.

Figure 4:
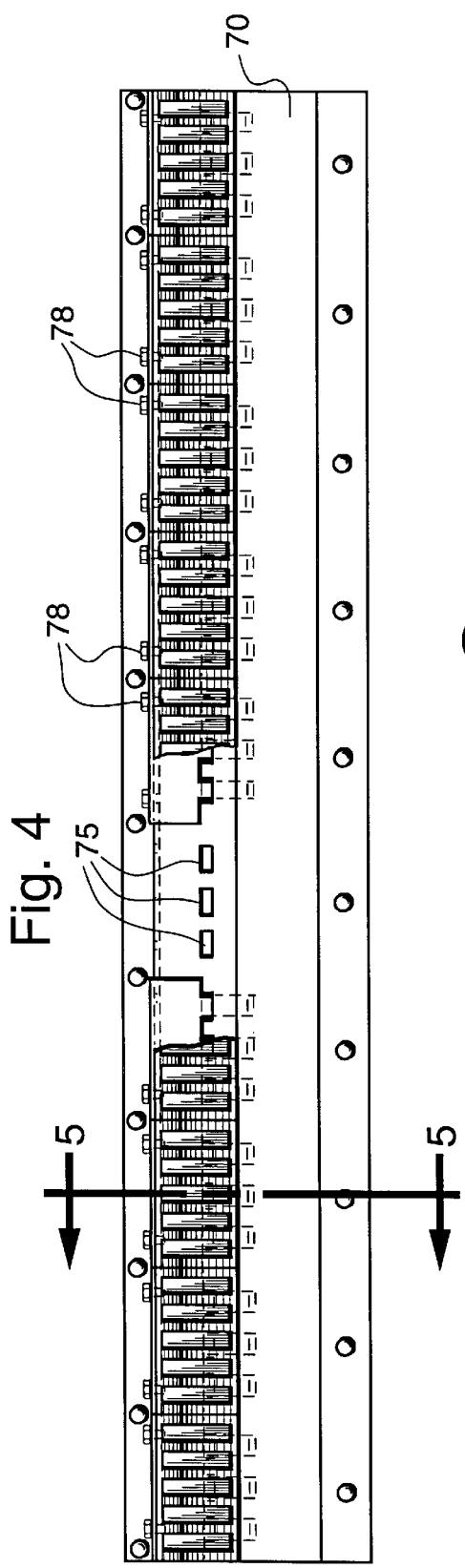
FIG. 4 is a plan view of that portion of FIG. 3 indicated by the line 4—4 of FIG. 3 with one reimpactor module removed and the shock-absorbent portion of the two adjacent modules broken away.
Figure 5:
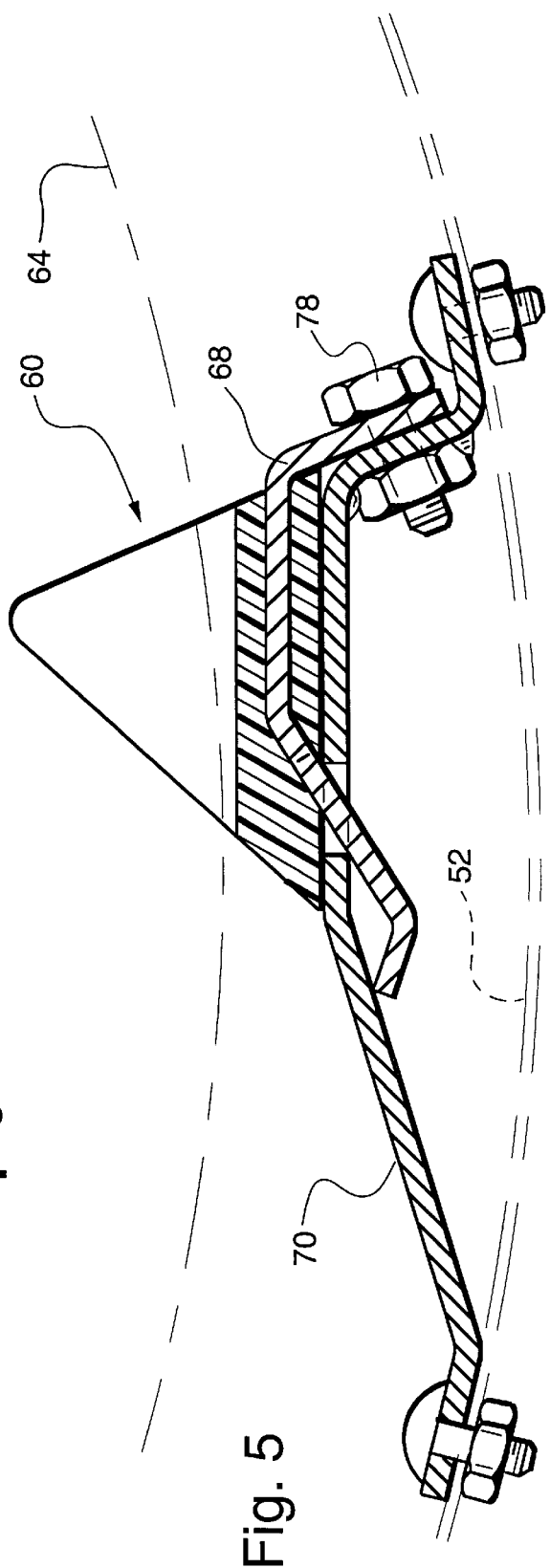
FIG. 5 is an enlarged sectional view taken along line 5—5 of FIG. 4 (reoriented to fit the page)

For convenience in assembly and replacement, reimpactor 60 is constructed in segments 66, each containing five slots. The material chosen for the main body of the reimpactor is polyurethane; however, other durable, elastic shock-absorbing materials such as, for example, rubber, are available and could fulfill this purpose quite adequately. The triangular shaped portion of the reimpactor, perhaps best seen in FIGS. 5–8, is formed on a metal plate 68 having, in this particular embodiment, three flanges (72, 73 and 74). An elongated plate 70 is mounted to curved sheet 52 and has therein regularly spaced slots 75 into which flanges 72–74 may be inserted. By then fitting the flanges and plate 68 properly on plate 70, reimpactor 60 will be in the position previously described and may be fixed there by the application of bolts 78. In this manner multiple reimpactor segments may be affixed to plate 70 along the longitudinal dimension of curved sheet 52 as shown in FIG. 4. The size of the reimpactor, in this embodiment the height of the triangular cross-section, may, of course, vary. It is of primary importance that the height be adequate to extend into the path of the flail elements as previously described.

FIG. 9 shows the flail segments 40 as having five finger-like elements 42. This is a convenient structure for casting and, when considered in conjunction with a five-slotted reimpactor, presents a very convenient structure for retrofitting the instant invention onto older machines, as well as constructing new machines. The five-finger structure additionally allows greater tolerance between the flail elements 42 and the sides of the slots 62, i.e., allows for larger slots. Cost effectiveness is thus improved.

Figure 11:
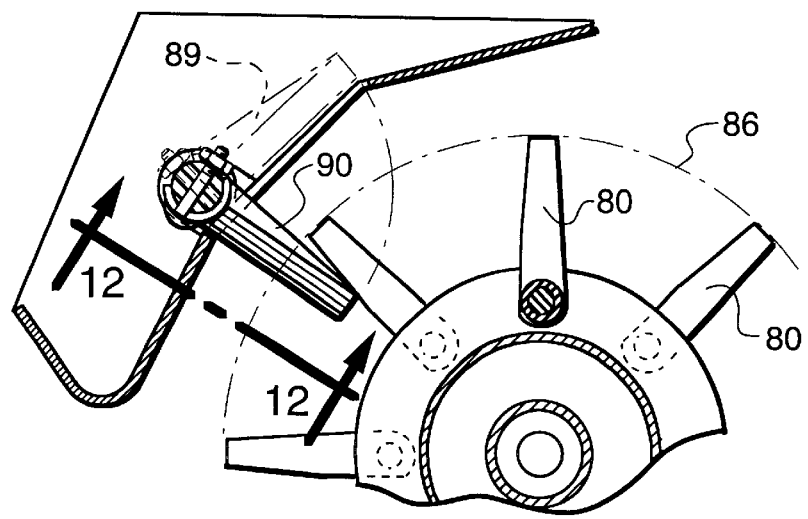
FIG. 11 is a view similar to FIG. 3 but showing the prior art reimpactor.
Figure 12:
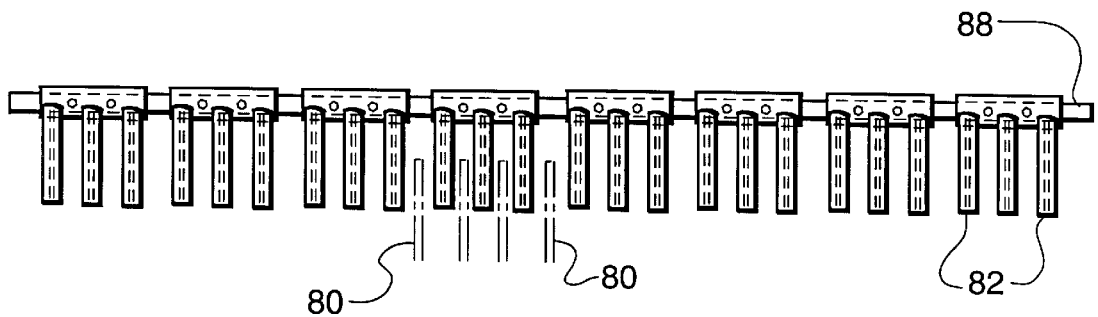
FIG. 12 is an elevational view of the prior art reimpactor taken on line 12—12 of FIG. 11.

FIGS. 11 and 12 show one prior art device that employs the rigid reimpactor. The flail-conditioner includes finger-like elements 80 which generate a path 86 at the tips thereof, which pass through rods 82 rigidly affixed to shaft 88. The shaft 88 may be rotated from a position 89 where there is no reimpaction provided, to position 90. All of the elements of the reimpactor are rigid and may thus be broken, bent or deformed if contacted by a stone or other solid object during operation.

Having thus described the invention, what is claimed is:

1. A crop conditioning apparatus comprising:
  a flail-conditioning chamber having a generally curved wall;
  an entrance in said wall for admitting crop material to said chamber;
  an exit in said wall generally opposing said entrance for discharging crop material from said chamber;
  a rotary flail conditioning unit generally between said entrance and said exit within said chamber for conditioning said crop material, said conditioning unit including a plurality of finger-like flail-conditioning elements rotating about a longitudinal axis, the outer ends thereof defining a generally circular path in cross-section and a cylindrical path about said longitudinal axis, said curved wall spaced apart from, but in close proximity to and generally covering a portion of said cylindrical path; and
  a first longitudinal slotted reimpactor comprised of an elastic shock-absorbent material affixed to said curved wall and extending at least partially through and into said cylindrical path, said slots generally aligned with and corresponding to said finger-like flail-conditioning elements such that said elements pass through said slots, said reimpactor having an angled face relative to said curved wall whereby crop material is fed through said entrance to said flail-conditioning elements for treatment, then directed to and along said curved wall by said conditioning elements, then back to said conditioning unit by said angled face of said reimpactor for additional conditioning, and thence to said exit for deposit on the ground.

2. The crop conditioning apparatus of claim 1, wherein:

said conditioning unit includes a drum-like core, elongated in the direction of said longitudinal axis; and said curved wall is generally co-extensive with said conditioning unit in the direction of said longitudinal axis.

3. The crop conditioner apparatus of claim 2, further including:

a frame supported by spaced-apart wheels and having a tongue for attachment to a prime mover to pull the conditioner in a forward direction, said chamber, conditioning unit and reimpactor affixed to said frame.

4. The crop conditioning apparatus of claim 3, wherein:

said reimpactor has a metallic strap base with a urethane member affixed thereto, said urethane member having a generally triangular cross-section with said slots therein extending part way into the apex thereof opposite said metallic strap.

5. The crop conditioning apparatus of claim 4, wherein:

said flail-conditioning elements are rotatably mounted to said drum-like core such that they rotate about said longitudinal axis and freely pivot about the point at which they are mounted to said drum-like core.

6. The crop conditioning apparatus of claim 5, wherein:

said flail-conditioning elements comprise multiple segments, each segment including more than one flail-conditioning element.

7. The crop conditioning apparatus of claim 6, wherein:

said segments are affixed to said core in a spiral manner around the circumference and along the length thereof.

8. The crop conditioning apparatus of claim 7, wherein:

each said segment is comprised of a casting with five said finger-like elements.

9. The crop conditioning apparatus of claim 8, wherein:

said reimpactor is formed in sections, each said section including five slots.

10. The crop conditioning apparatus of claim 9, including:

a second reimpactor, similar to said first reimpactor, affixed to said curved wall and spaced from said first reimpactor toward said exit.

11. In a flail conditioner to be moved through a field of crop by a prime mover, the conditioner including a flail-conditioning chamber having a generally curved wall, an entrance in said wall for admitting crop material to said chamber, an exit in said wall for discharging crop material from said chamber, a conditioning unit generally between said entrance and said exit within said chamber for conditioning said crop material, said conditioning unit including a plurality of finger-like flail-conditioning elements rotating about a longitudinal axis, the outer ends thereof defining a generally circular path in cross-section and a cylindrical path in front view about said longitudinal axis, said curved wall spaced apart from, but in close proximity to and generally covering a portion of said cylindrical path, the improvement comprising:

a first longitudinal slotted reimpactor comprised of an elastic shock-absorbent material affixed to said curved wall and extending at least partially through and into said cylindrical path, said slots generally aligned with and corresponding to said finger-like flail-conditioning elements such that said elements pass through said slots, said reimpactor having an angled face relative to said curved wall whereby crop material is fed through said entrance to said flail-conditioning elements for treatment, then directed to and along said curved wall by said conditioning elements, then back to said conditioning elements by said angled face of said reimpactor for additional conditioning, and thence to said exit for deposit on the ground.

12. The conditioner of claim 11, wherein:

said conditioning unit includes a drum-like core, elongated in the direction of said longitudinal axis; and said curved wall is generally co-extensive with said conditioning unit in the direction of said longitudinal axis.

13. The conditioner of claim 12, further including:

a frame supported by spaced-apart wheels and having a tongue for attachment to a prime mover to pull the conditioner in a forward direction, said chamber, conditioning unit and reimpactor affixed to said frame.

14. The conditioner of claim 13, wherein:

said reimpactor has a metallic strap base with a urethane member affixed thereto, said urethane member having a generally triangular cross-section with said slots therein extending part way into the apex thereof opposite said metallic strap.

15. The conditioner of claim 14, wherein:

said flail-conditioning elements are rotatably mounted to said drum-like core such that they rotate about said longitudinal axis and freely pivot about the point at which they are mounted to said drum-like core.

16. The conditioner of claim 15, wherein:

said flail-conditioning elements comprise multiple segments, each segment including more than one flail-conditioning element.

17. The conditioner of claim 16, wherein:

said segments are affixed to said core in a spiral manner around the circumference and along the length thereof.

18. The conditioner of claim 17, wherein:

each said segment is comprised of a casting with five said finger-like elements.

19. The conditioner of claim 18, wherein:

said reimpactor is formed from sections, each said section including five slots.

20. The conditioner of claim 19, including:

a second reimpactor, similar to said first reimpactor, affixed to said curved wall and spaced from said first reimpactor toward said exit.

* * * * *